United States Patent
Baba et al.

(10) Patent No.: US 10,432,006 B2
(45) Date of Patent: Oct. 1, 2019

(54) CHARGE/DISCHARGE CONTROL APPARATUS

(71) Applicant: PANASONIC INTELLECTUAL PROPERTY MANAGEMENT CO., LTD., Osaka (JP)

(72) Inventors: Akira Baba, Tokyo (JP); Haruka Nakasone, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/572,448

(22) PCT Filed: Apr. 21, 2016

(86) PCT No.: PCT/JP2016/002121
§ 371 (c)(1),
(2) Date: Nov. 7, 2017

(87) PCT Pub. No.: WO2016/181617
PCT Pub. Date: Nov. 17, 2016

(65) Prior Publication Data
US 2018/0138731 A1    May 17, 2018

(30) Foreign Application Priority Data
May 13, 2015 (JP) .................. 2015-098071

(51) Int. Cl.
*H02J 7/00* (2006.01)
*H02J 3/32* (2006.01)
(Continued)

(52) U.S. Cl.
CPC ............ *H02J 7/0068* (2013.01); *G05B 15/02* (2013.01); *G06Q 30/0283* (2013.01);
(Continued)

(58) Field of Classification Search
CPC ........ H02J 7/00; H02J 7/02; H02J 7/35; H02J 7/0068; H02J 3/32; H02J 3/383;
(Continued)

(56) References Cited

U.S. PATENT DOCUMENTS 9,537,420 B2 * 1/2017 Barnes .................... H02J 3/383
2006/0229768 A1 * 10/2006 Chassin .................... H02J 3/14
700/295

(Continued)

FOREIGN PATENT DOCUMENTS

EP    2 722 958 A1    4/2014
JP    2011-083082 A    4/2011
(Continued)

OTHER PUBLICATIONS

International Search Report and Written Opinion issued in International Patent Application No. PCT/JP2016/002121; dated Jul. 12, 2016; with partial English translation.

(Continued)

*Primary Examiner* — Fritz M Fleming
*Assistant Examiner* — Jagdeep S Dhillon
(74) *Attorney, Agent, or Firm* — McDermott Will & Emery LLP

(57) ABSTRACT

A charge/discharge control apparatus includes: a controller which performs a discharge control to discharge a rechargeable battery and a charge control to charge the rechargeable battery using excess power which is power, among generated power, which is not to be consumed by a load; and a setter which sets a threshold value for remaining energy in the rechargeable battery, according to a planned discharged energy amount which is planned as a discharged energy amount to be supplied from the rechargeable battery to the load during a specified time period. The controller performs a discharge prohibition control to prohibit a discharge of the (Continued)

rechargeable battery when the remaining energy in the rechargeable battery is equal to or below the threshold value prior to the specified time period.

7 Claims, 4 Drawing Sheets

(51) Int. Cl.
    *H02J 3/38*     (2006.01)
    *H02J 7/35*     (2006.01)
    *G05B 15/02*     (2006.01)
    *G06Q 30/02*     (2012.01)
    *G06Q 50/06*     (2012.01)
    *H02J 3/46*     (2006.01)

(52) U.S. Cl.
    CPC ............... *G06Q 50/06* (2013.01); *H02J 3/32* (2013.01); *H02J 3/38* (2013.01); *H02J 3/383* (2013.01); *H02J 3/46* (2013.01); *H02J 7/35* (2013.01)

(58) Field of Classification Search
    CPC .......... H02J 3/46; B60W 10/08; B60W 10/26; B60W 10/06; B60W 20/00
    USPC ................. 307/19, 9.1, 10.1, 66, 64, 80, 82; 701/22, 99; 320/135, 134; 903/930
    See application file for complete search history.

(56) References Cited

U.S. PATENT DOCUMENTS

| | | | |
|---|---|---|---|
| 2011/0066310 A1* | 3/2011 | Sakai | B60L 1/00 701/22 |
| 2011/0250475 A1* | 10/2011 | Yamamoto | H01M 2/0277 429/7 |
| 2011/0291479 A1 | 12/2011 | Lee | |
| 2012/0065826 A1* | 3/2012 | Kinoshita | B60L 58/10 701/22 |
| 2012/0072066 A1* | 3/2012 | Kato | B60K 6/365 701/22 |
| 2012/0235625 A1 | 9/2012 | Takehara | |
| 2013/0162025 A1 | 6/2013 | Momose et al. | |
| 2013/0289854 A1* | 10/2013 | Takahashi | H02J 7/0057 701/112 |
| 2014/0052310 A1 | 2/2014 | Baba et al. | |
| 2014/0084686 A1* | 3/2014 | Nishibayashi | H02J 3/32 307/26 |
| 2014/0214250 A1* | 7/2014 | Murakami | B60W 10/06 701/22 |
| 2014/0309824 A1* | 10/2014 | Bito | B60W 10/08 701/22 |
| 2014/0309827 A1* | 10/2014 | Kanzaki | B60L 3/04 701/22 |
| 2014/0327408 A1* | 11/2014 | Ishii | B60L 53/53 320/135 |
| 2014/0365099 A1* | 12/2014 | Tochigi | F02D 17/04 701/99 |
| 2015/0162768 A1* | 6/2015 | Okuda | H02J 7/0047 320/134 |
| 2016/0153417 A1* | 6/2016 | Tochigi | F02D 17/04 123/339.24 |
| 2016/0229411 A1* | 8/2016 | Murata | B60L 58/12 |

FOREIGN PATENT DOCUMENTS

| | | |
|---|---|---|
| JP | 2011-254696 A | 12/2011 |
| JP | 2012-249476 A | 12/2012 |
| JP | 2013-176187 A | 9/2013 |
| JP | 2014-057505 A | 3/2014 |
| JP | 2014-158404 A | 8/2014 |
| JP | 2014-165952 A | 9/2014 |
| WO | 2012/017936 A1 | 2/2012 |

OTHER PUBLICATIONS

Extended European Search Report issued in related European Application No. 16792347.3 dated Apr. 20, 2018.

* cited by examiner

CHARGE/DISCHARGE CONTROL APPARATUS

RELATED APPLICATIONS

This application is the U.S. National Phase under 35 U.S.C. § 371 of International Patent Application No. PCT/JP2016/002121, filed on Apr. 21, 2016, which in turn claims the benefit of Japanese Application No. 2015-098071, filed on May 13, 2015, the entire disclosures of which Applications are incorporated by reference herein.

TECHNICAL FIELD

The present invention relates to a charge/discharge control apparatus for use in a power system for supplying a load with power, using power discharged from a rechargeable battery and power generated from a power source for power generation utilizing a renewable energy source.

BACKGROUND ART

In a conventional power system, a load in a building is supplied with power using a solar cell and a rechargeable battery. In this kind of system, the power is supplied to the load by combination of the power generated by the solar cell and the power discharged from the rechargeable battery. The charging system described in PTL1 is an example of this kind of system.

CITATION LIST

Patent Literature

PTL1: Japanese Unexamined Patent Application Publication No. 2011-83082

SUMMARY OF THE INVENTION

Technical Problems

However, when the remaining energy in the rechargeable battery is not adequately secured prior to a specified time period, the remaining energy in the rechargeable battery might run short and a sufficient amount of discharged power might not be obtained from the rechargeable battery during the specified time period. For example, when the remaining energy in the rechargeable battery is not adequately secured prior to the time period during which the power generated by the solar cell is unobtainable, the discharged power might not be sufficiently obtained from the rechargeable battery during such time period. As a result, a sufficient amount of power might not be obtained from both the solar cell and the rechargeable battery.

In addition, it is inefficient to unnecessarily or excessively secure the remaining energy in the rechargeable battery prior to the specified time period.

The present invention is made in view of the above-described problem and aims to provide a charge/discharge control apparatus and others which can adequately secure the remaining energy in a rechargeable battery prior to a specified time period.

Solution to Problem

A charge/discharge control apparatus according to one aspect of the present invention is a charge/discharge control apparatus for use in a power system for supplying a load with power using discharged power from a rechargeable battery and generated power from a power source for power generation utilizing a renewable energy source. The apparatus includes: a controller which performs a discharge control to discharge the rechargeable battery and a charge control to charge the rechargeable battery using excess power which is power, among the generated power, which is not to be consumed by the load; and a setter which sets a threshold value for remaining energy in the rechargeable battery, according to a planned discharged energy amount which is planned as a discharged energy amount to be supplied from the rechargeable battery to the load during a specified time period.

Advantageous Effect of Invention

With the charge/discharge control apparatus according to one aspect of the present invention, the remaining energy in a rechargeable battery can be adequately secured prior to a specified time period.

DESCRIPTION OF EXEMPLARY EMBODIMENT

The following describes an embodiment according to the present invention with reference to the drawings. Note that the embodiment described below illustrates a comprehensive or concrete example of the present invention. The values, shapes, materials, components, the arrangement and connection of the components, an order of operations, etc. shown in the following embodiment are mere examples, and therefore do not intend to limit the inventive concept of the present invention. Among the components described in the following embodiment, the components not recited in any one of independent claims presenting the primary concept of the present invention are described as arbitrary components.

In addition, electric energy normally refers to an integrated value of electric power during a predetermined period of time and is equivalent to energy. Then, energy per hour is equivalent to electric power (power). The electric power (power) and the electric energy (energy) corresponds to each other, therefore, in the description, power may be referred to as energy and vice versa in some cases. An amount of power may be referred to as energy in some cases.

Moreover, current, power, and energy may be referred to as values respectively indicating these. Charge/discharge is referred to as at least one of charge and discharge.

Embodiment

Figure 1:
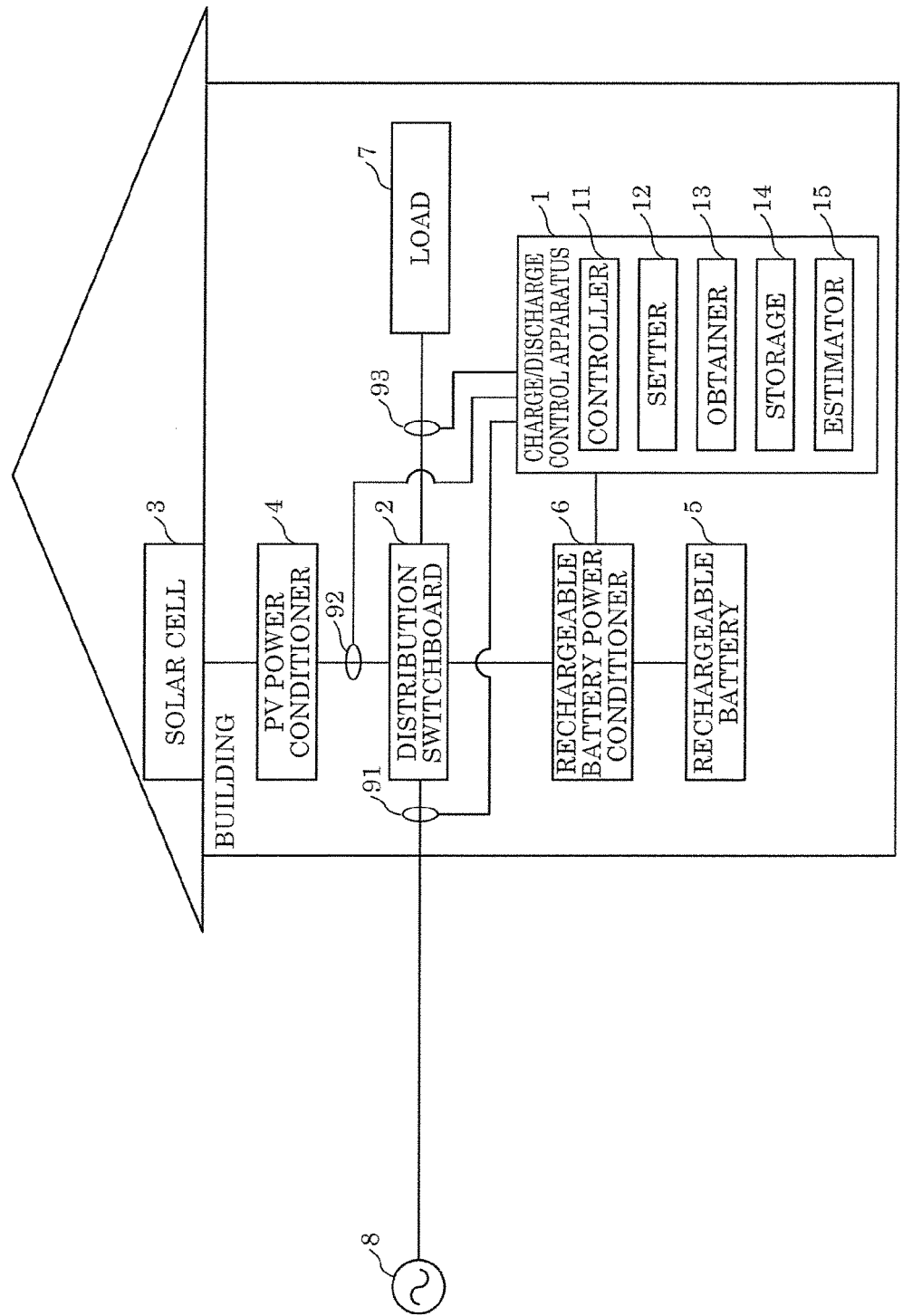
FIG. 1 is a block diagram showing an overall configuration of a power system using a charge/discharge control apparatus according to an embodiment.

FIG. 1 shows an overall configuration of a power system. The power system includes charge/discharge control apparatus 1, distribution switchboard 2, solar cell (power source) 4, PV power conditioner 3, rechargeable battery 5, rechargeable battery power conditioner 6, and current sensors 91 to 93, and supplies power to load 7. Note that the power system is applied to a single-family house in the present embodiment, however, the power system may be applied to a building such as a collective housing, a business establishment, and so on.

The power system uses solar cell 3, rechargeable battery 5, and system power source 8, as a power source for supplying power to load 7.

Alternating-current power (commercial power) is supplied from system power source 8 to distribution switchboard 2. In addition, alternating power (generated power) is supplied from solar cell 3, which is a distributed power source, to distribution switchboard 2 via PV power conditioner 4. Moreover, alternating power (discharged power) is supplied from solar cell 5 to distribution switchboard 2 via rechargeable battery power conditioner 6.

Furthermore, a main breaker, plural branch breakers, switches, etc. are included in distribution switchboard 2. The branch breakers in distribution switchboard 2 are provided for plural branch circuits. Distribution switchboard 2 provides alternating current power to load 7 via the branch circuits.

Note that load 7 in FIG. 1 is an electric device such as an illuminating device, an air conditioner, or information-processing equipment which is connected to one of the branch circuits. Plural loads 7 may be connected to distribution switchboard 2 via the branch circuits.

Solar cell 3 generates power using sunlight. PV power conditioner 4 converts, into alternating-current power, the direct-current power obtained through the power generation by solar cell 3, and outputs the alternating-current power as the generated power of solar cell 3. In addition, in order to perform a system interconnection with system power source 8, PV power conditioner 4 adjusts frequency and output voltage of the alternating-current power (generated power of solar cell 3) that is output by PV power conditioner 4.

Rechargeable battery 5 is connected to distribution switchboard 2 via rechargeable battery power conditioner 6. Rechargeable battery power conditioner 6 performs charge/discharge of rechargeable battery 5. To be more precise, rechargeable battery power conditioner 6 converts the alternating-current power supplied from distribution switchboard 2 into direct-current power and supplies rechargeable battery 5 with the direct-current power, so as to charge rechargeable battery 5. Moreover, rechargeable battery power conditioner 6 allows rechargeable battery 5 to discharge, converts the direct-current power supplied from rechargeable battery 5 into alternating-current power, and supplies the alternating-current power to distribution switchboard 2.

Furthermore, in order to perform a system interconnection with system power source 8, rechargeable battery power conditioner 6 adjusts frequency and output voltage of the alternating current-power (discharged power) that is output by rechargeable battery power conditioner 6.

The generated power of solar cell 3 is used for a part or all of load power, charged power, and reverse flow power. The discharged power of rechargeable battery 5 is used for the load power. The load power is a total power consumed by the whole of load 7 (a sum of the power consumed by plural loads 7). The charged power is power charged by rechargeable battery 5. The reverse flow power is power which reversely flows to system power source 8.

Current sensor 91 measures a current between system power source 8 and distribution switchboard 2, and outputs, to charge/discharge control apparatus 1, measurement data indicating the measured current. Current sensor 92 measures a current supplied from PV power conditioner 4 to distribution switchboard 2, and outputs, to charge/discharge control apparatus 1, measurement data indicating the measured current. Current sensor 93 measures a total current flow supplied from distribution switchboard 2 to the whole of load 7 (a total amount of the current supplied to plural loads 7), and outputs, to charge/discharge control apparatus 1, measurement data indicating the total amount of current that has been measured.

Charge/discharge control apparatus 1 includes controller 11, setter (threshold value setter) 12, obtainer (data obtainer) 13, storage 14, and estimator 15, and controls the charge/discharge operation performed onto rechargeable battery 5 by rechargeable battery power conditioner 6. Namely, charge/discharge control apparatus 1 controls, via rechargeable battery power conditioner 6, charge (charged power) of rechargeable battery 5 and discharge (discharged power) of rechargeable battery 5.

Charge/discharge control apparatus 1 then adjusts, through the control of charge/discharge, the commercial power supplied from system power source 8 to load 7 and the reverse flow power that reversely flows from solar cell 3 to system power source 8. Note that, in this power system, charge/discharge control apparatus 1 allows the generated power of solar cell 3 to reversely flow to system power source 8, but does not allow the discharged power of rechargeable battery 5 to reversely flow to system power source 8.

In addition, charge/discharge control apparatus 1 may include only part of controller 11, setter 12, obtainer 13, storage 14, and estimator 15. The other components may be included in an apparatus different from charge/discharge control apparatus 1. For example, charge/discharge control apparatus 1 may include only controller 11 and setter 12 among controller 11, setter 12, obtainer 13, storage 14, and estimator 15.

Controller 11 is a control unit which performs a charge control to charge rechargeable battery 5 using excess power and a discharge control to discharge rechargeable battery 5, by controlling the charging/discharging operation performed onto rechargeable battery 5 by rechargeable battery power conditioner 6. Here, the excess power is power that is not to be consumed by load 7 among the power generated by solar cell 3. The discharged power discharged by rechargeable battery 5 is supplied to load 7.

In general, a maximum (peak) amount of load energy (an amount of energy demanded in a household) that varies during the day occurs in the early-evening. During the specified time period after and including the early-evening, the amount of load energy is relatively large during the day and the power generated by solar cell 3 is 0 or very low. Here, the specified time period may be peak hours including a time period during which the amount of load energy is at its peak, that is, early-evening. In addition, the time period during which the amount of load energy is at its peak may be a time period during which the amount of load energy is at maximum during the day.

In order to restrain the energy of commercial power during the specified time period, it is better that the remaining energy in rechargeable battery 5 (state of charge (SOC)) is adequately secured prior to the start time of the specified time period. However, the load energy during the specified time period differs depending on household. Accordingly, in a household where the amount of load energy is large during the specified time period, the remaining energy in rechargeable battery 5 is not sufficiently secured prior to the start time of the specified time period, and the power that can be supplied from rechargeable battery 5 to load 7 during the specified time period might run short.

Therefore, in order to adequately secure the remaining energy in rechargeable battery 5, controller 11 switches a control mode of rechargeable battery power conditioner 6 to a discharge prohibition mode or a discharge permission mode so as to control the charging/discharging operation performed onto rechargeable battery 5 by rechargeable battery power conditioner 6. Here, in the discharge prohibition mode, a discharge prohibition control is performed to prohibit the discharge of rechargeable battery 5. Here, in the discharge permission mode, a discharge permission control is performed to permit the discharge of rechargeable battery 5.

Specifically, in the case where generated power runs short with respect to load power, rechargeable battery power conditioner 6 does not allow rechargeable battery 5 to discharge in the discharge prohibition mode, and allows rechargeable battery 5 to discharge in the discharge permission mode.

Note that, in some cases, the discharge prohibition mode may be referred to as excess charge mode and the discharge permission mode may be referred to as self-consumption mode. Moreover, in the case where the excess power surpassing the load energy in amount is generated out of the generated power, rechargeable battery power conditioner 6 allows rechargeable battery 5 to charge with the excess power whichever the mode may be, the discharge prohibition mode or the discharge permission mode.

Obtainer 13 is an obtainment unit which obtains each measurement data of respective current sensors 91 to 93 and stores the measurement data into storage 14. A history of each measurement data of current sensors 91 to 93 is stored into storage 14. In addition, obtainer 13 may obtain the data related to rechargeable battery 5 from rechargeable battery power conditioner 6. The data related to rechargeable battery 5 may be data indicating the remaining energy stored in rechargeable battery 5, data indicating the charging current of rechargeable battery 5, data indicating the discharging current of rechargeable battery 5, and so on.

Estimator 15 is an estimation unit which refers to the data in storage 14, and estimates a planned discharged energy amount planned as the discharged energy amount to be supplied from rechargeable battery 5 to load 7 during the specified time period, based on the history of the measurement data (load current) of current sensor 93.

To be more concrete, since the history of the measurement data of current sensor 93 is equivalent to a history of load power, estimator 15 obtains an average value of the amounts of the load energy consumed during the specified time period in the past, based on the history of the load power during the specified time period. Here, estimator 15 uses the measurement data obtained over a predetermined time period (e.g., a week, a month, or six months) in the past. Estimator 15 then estimates, as the planned discharged energy amount, an average value of the amounts of the load energy consumed during the specified time period, based on the measurement data obtained over the predetermined time period in the past.

Estimator 15 estimates the planned discharged energy amount based on the history of load power that differs depending on household. Therefore, the planned discharged energy amount that has been estimated is based on an actual power usage pattern of each household. Note that estimator 15 may estimate a maximum value for the load energy during the specified time period as the planned discharged energy amount. Estimator 15 may learn about load power based on the history of load power and estimate the planned discharged energy amount based on the learning results.

In addition, estimator 15 may estimate the planned discharged energy amount for each season. For example, estimator 15 may divide a year into plural seasons of spring, summer, autumn, and winter, each including four months, and estimate the amount of energy planned to be discharged in spring, based on the history of the load power during the specified time period in springtime. Similarly, estimator 15 may estimate the amount of energy planned to be discharged in each season of summer, autumn, and winter, based on the history of the load power during the specified time period in each season.

In addition, estimator 15 may estimate the planned discharged energy amount for each day of the week. In addition, estimator 15 may estimate the amount of energy planned to be discharged on Monday, based on the history of the load power during the specified time period on Monday. Similarly, estimator 15 may estimate the amount of energy planned to be discharged on each day of the week from Tuesday to Sunday, based on the history of the load power during the specified time period on each day of the week.

Setter 12 derives a remaining battery level (remaining energy in rechargeable battery 5) that is based on the planned discharged energy amount that has been estimated by estimator 15, as a threshold value for switching between the abovementioned discharge prohibition mode and discharge permission mode. In other words, setter 12 is a setting unit which sets a threshold value according to the planned discharged energy amount, for the remaining energy in rechargeable battery 5. Here, the threshold value is equivalent to the remaining battery level with which the planned discharged energy amount can be supplied. For example, the remaining battery level that is equal to the planned discharged energy amount or the remaining battery level that is higher than the planned discharged energy amount may be set for the threshold value.

In addition, setter 12 may derive, per season or per day of the week, a threshold value for the remaining energy in rechargeable battery 5, according to the amount of the energy planned to be discharged in each season or on each day of the week.

Then, when the remaining energy in rechargeable battery 5 is equal to or below the threshold value prior to the specified time period, controller 11 controls rechargeable battery power conditioner 6 in the discharge prohibition mode. When the remaining energy in rechargeable battery 5 is above the threshold value prior to the specified time period, controller 11 controls rechargeable battery power conditioner 6 in the discharge permission mode. Namely, controller 11 controls the charge and discharge of rechargeable battery 5 so that the remaining energy in rechargeable battery 5 does not go below the threshold value prior to the specified time period.

Moreover, during the specified time period, controller 11 controls rechargeable battery power conditioner 6 in the discharge permission mode regardless of whether the remaining energy in rechargeable battery 5 is above or below the threshold value. In other words, during the specified time period, in the case where the remaining energy in rechargeable battery 5 is not 0 and the generated power runs short with respect to load power the discharged power of rechargeable battery 5 is used for load power.

Figure 2:
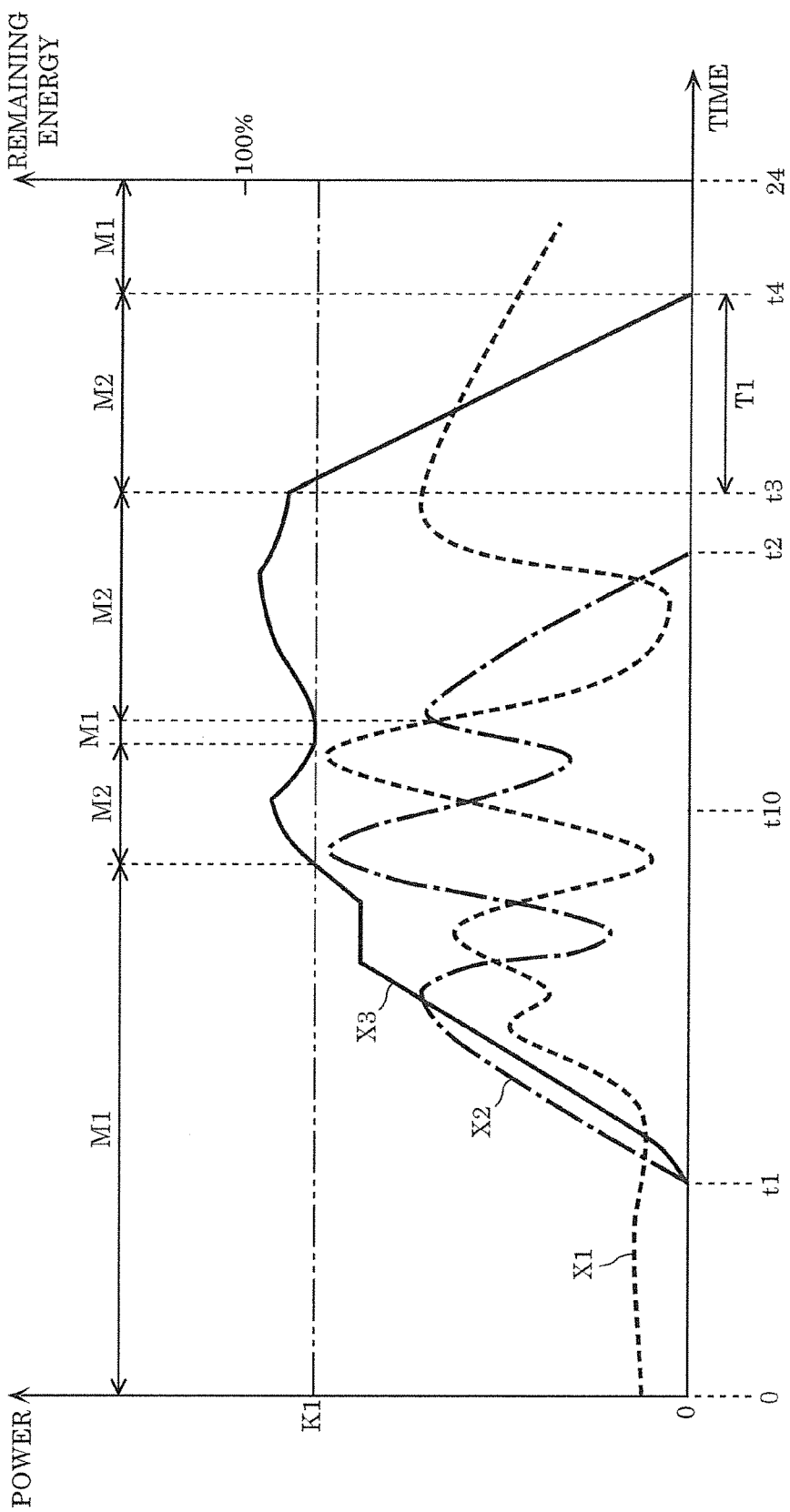
FIG. 2 is a schematic diagram showing an example of a power pattern during a day, according to the embodiment.

The following describes the power control according to the present embodiment, with reference to FIG. 2. FIG. 2 shows an example of power pattern during a day, where X1 (broken line) represents the load power consumed by load 7, X2 (alternate long and short dash line) represents the generated power of solar cell 3, and X3 (full line) represents the remaining energy stored in rechargeable battery 5.

First, load power X1 increases since morning when a demander starts his/her daily activities. During the day time after that, load power X1 varies according to the usage state of load 7. Then, in the early-evening, load power X1 increases again. After that, load power X1 decreases.

Generated power X2 of solar cell 3 increases since operation start time t1 (in the vicinity of the time at which the sun rises) of PV power conditioner 4 if the weather is fine enough to sufficiently ensure solar irradiation. In the day time, generated power X2 of solar cell 3 then decreases after having reached its maximum value in the vicinity of culmination time t10. Generated power X2 of solar cell 3 then becomes 0 after operation stop time t2 (in the vicinity of the time at which the sun sets) of PV power conditioner 4.

Then, in the case where generated power X2 of solar cell 3 goes above 0 prior to specified time period T1 (from morning till early-evening), generated power X2 is used for load power X1. In the case where load power X1 is greater than generated power X2, shortage power (=load power X1−generated power X2) is mainly covered by commercial power. In addition, in the case where generated power X2 is greater than load power X1, rechargeable battery power conditioner 6 allows rechargeable battery 5 to charge with excess power (=generated power X2−load power X1).

Then, remaining energy X3 stored in rechargeable battery 5 is basically used to cover load power X1 during specified time period T1. Moreover, in the case where it is determined that remaining energy X3 in rechargeable battery 5 is sufficiently secured prior to specified time period T1, remaining energy X3 in rechargeable battery 5 may be used to cover load power X1 even prior to specified time period T1.

More precisely, in FIG. 2, controller 11 operates as follows during a time period starting from 0 o'clock until start time t3 of specified time period T1. Controller 11 controls rechargeable battery power conditioner 6 in the discharge prohibition mode during period M1 in which remaining energy X3 in rechargeable battery 5 is equal to or below threshold value K1. In this case, controller 11 performs a discharge prohibition control to prohibit the discharge of rechargeable battery 5. In the discharge prohibition mode, when excess power is provided, controller 11 allows rechargeable battery 5 to charge with the excess power.

Here, threshold value K1 is set by setter 12 and indicates the remaining battery level with which the planned discharged energy amount can be supplied during specified time period T1.

In the case where remaining energy X3 in rechargeable battery 5 is equal to or below threshold value K1, controller 11 determines that the planned discharged energy amount cannot be covered by remaining energy X3 in rechargeable battery 5 and controls rechargeable battery power conditioner 6 in the discharge prohibition mode. Accordingly, power control is performed so that the planned discharged energy amount is covered by remaining energy X3 in rechargeable battery 5.

Figure 3:
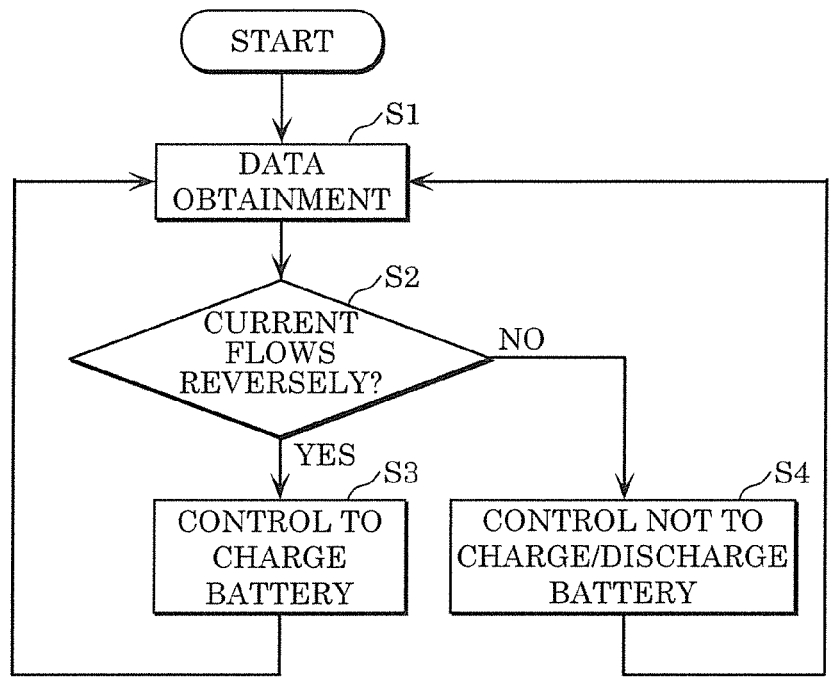
FIG. 3 is a flowchart showing an operation in a discharge prohibition mode, according to the embodiment.

The flowchart in FIG. 3 shows an example of the control performed by controller 11 in the discharge prohibition mode. First, controller 11 obtains measurement data from respective current sensors 91 to 93 and obtains the data related to rechargeable battery 5 from rechargeable battery power conditioner 6 (S1). Controller 11 then determines whether or not a reverse flow current flowing from distribution switchboard 2 to system power source 8 occurs, based on the measurement data of current sensor 91 (S2).

Then, in the case where a reverse flow current occurs, controller 11 determines that excess power reversely flows, and controls rechargeable battery power conditioner 6 to discharge rechargeable battery 5 (S3). More precisely, controller 11 instructs rechargeable battery power conditioner 6 to charge rechargeable battery 5 so that rechargeable battery 5 is charged with the excess power and the reverse flow current approximates 0.

In addition, in the case where the reverse flow current does not occur, controller 11 controls rechargeable battery power conditioner 6 not to charge or discharge rechargeable battery 5 (S4). More precisely, controller 11 instructs rechargeable battery power conditioner 6 to stop the charge/discharge of rechargeable battery 5 so that charged power and discharged power become 0.

Moreover, controller 11 controls rechargeable battery power conditioner 6 in the discharge permission mode during period M2 in which remaining energy X3 in rechargeable battery 5 is above threshold value K1. In this case, controller 11 performs a discharge permission control to permit the discharge of rechargeable battery 5. In the discharge permission mode, when excess power is provided, controller 11 allows rechargeable battery 5 to charge with the excess power.

In other words, in the case where remaining energy X3 in rechargeable battery 5 is above threshold value K1, controller 11 determines that the planned discharged energy amount can be covered by remaining energy X3 in rechargeable battery 5 and controls rechargeable battery power conditioner 6 in the discharge permission mode. Therefore, in the case where it is determined that the planned discharged energy amount can be covered with remaining energy X3 in rechargeable battery 5, controller 11 supplies the discharged power of rechargeable battery 5 to load 7. This enables an effective use of remaining energy X3 in rechargeable battery 5 prior to specified time period T1. In addition, the amount of electricity purchased from a commercial power retailer is restrained and the power cost is thus reduced.

Then, during specified time period T1, controller 11 controls rechargeable battery power conditioner 6 in the discharge permission mode regardless of whether remaining energy X3 in rechargeable battery 5 is above or below threshold value K1. Namely, during specified time period T1, the discharged power of rechargeable battery 5 is used for load power X1, even when remaining energy X3 in rechargeable battery 5 is equal to or below threshold value K1. Thus, remaining energy X3 in rechargeable battery 5 is effectively used during specified time period T1. In addition, the amount of electricity purchased from a commercial power retailer is restrained and the power cost is thus reduced.

Figure 4:
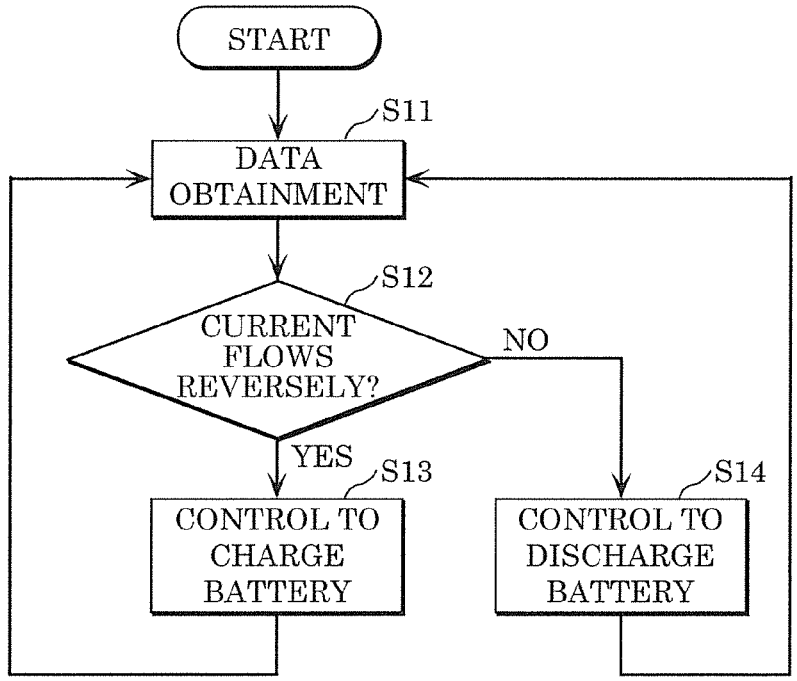
FIG. 4 is a flowchart showing an operation in a discharge permission mode, according to the embodiment.

The flowchart in FIG. 4 shows an example of the control performed by controller 11 in the discharge permission mode. First, controller 11 obtains measurement data from respective current sensors 91 to 93 and obtains the data related to rechargeable battery 5 from rechargeable battery power conditioner 6 (S11). Controller 11 then determines whether or not a reverse flow current flowing from distribution switchboard 2 to system power source 8 occurs, based on the measurement data of current sensor 91 (S12).

Then, in the case where a reverse flow current occurs, controller 11 determines that the excess power reversely flows, and controls rechargeable battery power conditioner 6 to charge rechargeable battery 5 (S13). More precisely, controller 11 instructs rechargeable battery power conditioner 6 to charge rechargeable battery 5 so that rechargeable battery 5 is charged with the excess power and the reverse flow current approximates 0.

In addition, in the case where the reverse flow current does not occur, controller 11 controls rechargeable battery power conditioner 6 to discharge rechargeable battery 5 (S14). More precisely, controller 11 instructs rechargeable battery power conditioner 6 to discharge rechargeable battery 5 so that the discharged power is supplied to load 7 via distribution switchboard 2. This enables the effective use of remaining energy X3 in rechargeable battery 5. In addition, the amount of electricity purchased is reduced.

As has been described above, controller 11 performs power control so that remaining energy X3 in rechargeable battery 5 is above threshold value K1 during the time period starting from 0 o'clock until start time t3 of specified time period T1.

Controller 11 then controls rechargeable battery power conditioner 6 in the discharge permission mode during specified time period T1. In the example shown in FIG. 2, start time t3 of specified time period T1 is after operation stop time t2 of PV power conditioner 4. During specified time period T1, generated power X2 of solar cell 3 is 0 and excess power does not occur.

Accordingly, in this example, controller 11 does not perform the charge control to charge rechargeable battery 5 with excess power during specified time period T1. On the contrary, controller 11 instructs rechargeable battery power conditioner 6 to discharge rechargeable battery 5. This enables the effective use of remaining energy X3 in rechargeable battery 5, and thus, the amount of electricity purchased can be reduced.

Controller 11 may control a discharge rate so that remaining energy X3 in rechargeable battery 5 becomes 0 at end time t4 of specified time period T1.

Moreover, remaining energy X3 in rechargeable battery 5 and threshold value K1 may be respectively represented by SOC (%), dischargeable energy (Wh), or dischargeable capacity (Ah).

Figure 5A:
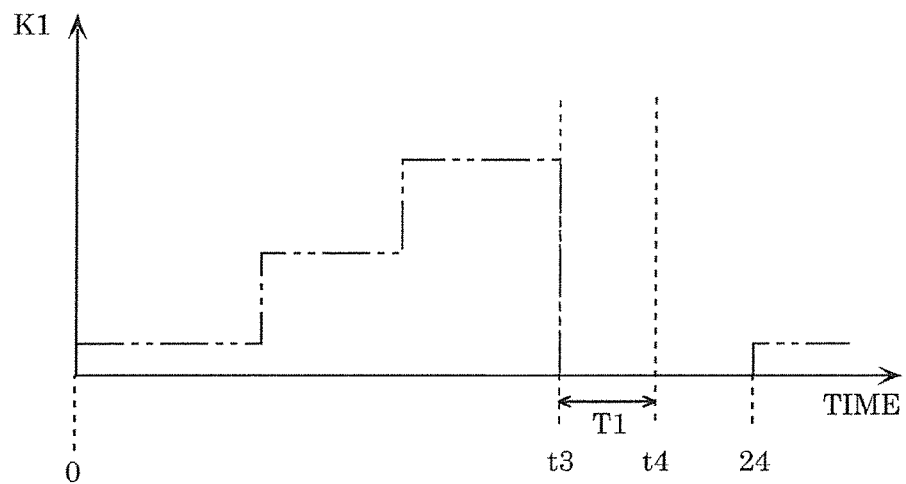
FIG. 5A is a schematic diagram showing a first example of setting a threshold value, according to the embodiment.

Furthermore, setter 12 may increase threshold value K1 in stages prior to specified time period T1, as shown in FIG. 5A. Namely, in the case where there is much time remaining until start time t3 prior to start time t3 of specified time period T1, a small value may be set for threshold value K1. Then, threshold value K1 may be set to be sequentially higher with a decrease in the time remaining until start time t3 of specified time period T1.

In the example shown in FIG. 5A, when there is much time remaining until start time t3 of specified time period T1, a small value is set for threshold value K1. Therefore, it is highly possible that control is performed in the discharge permission mode. Thus, with the supply of the discharged power of rechargeable battery 5 to load 7, the remaining energy in rechargeable battery 5 is effectively used. Accordingly, the amount of electricity purchased from a commercial power retailer is restrained and the power cost is thus reduced.

Then, threshold value K1 is set higher with the decrease in the time remaining until start time t3 of specified time period T1. Therefore, it is highly possible that control is performed in the discharge prohibition mode. Accordingly, the remaining energy in rechargeable battery 5 is sufficiently secured prior to start time t3 of specified time period T1.

In addition, when setter 12 sets a large value for threshold value K1 in a timing earlier than usual, the planned discharged energy amount is surely secured in rechargeable battery 5. Moreover, when setter 12 sets a large value for threshold value K1 in a timing later than usual, the remaining energy in rechargeable battery 5 is used more effectively prior to specified time period T1, and the amount of electricity purchased from a commercial power retailer is restrained even more.

Figure 5B:
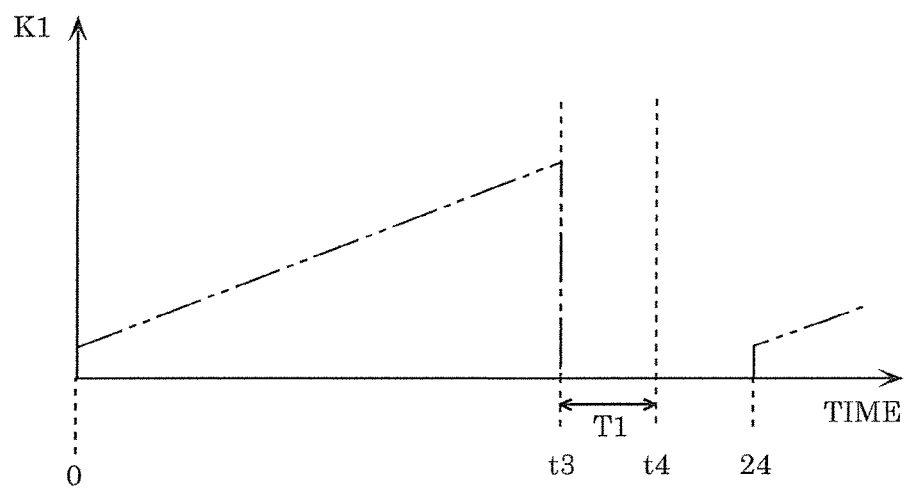
FIG. 5B is a schematic diagram showing a second example of setting a threshold value, according to the embodiment.

Note that setter 12 may continuously increase threshold value K1 prior to specified time period T1, as shown in FIG. 5B.

Furthermore, specified time period T1 as mentioned above is the time period after and including early-evening when the amount of load energy is at its peak. However, in the case where a power price plan, in which a power unit cost of commercial power varies according to a time period of the day, is applied, specified time period T1 may be the time period during which a power unit cost is higher than that in another time period. In addition, specified time period T1 may include the time period during which a power unit cost is higher than that in another time period. Moreover, specified time period T1 may be determined as the time period after and including early-evening during which generated power cannot be sufficiently obtained.

Furthermore, controller 11 may include a condition that the discharge prohibition mode should be operated during a limited time period that is previously determined, into the conditions for executing the discharge prohibition mode. The limited time period is also referred to as permitted time period.

Figure 6:
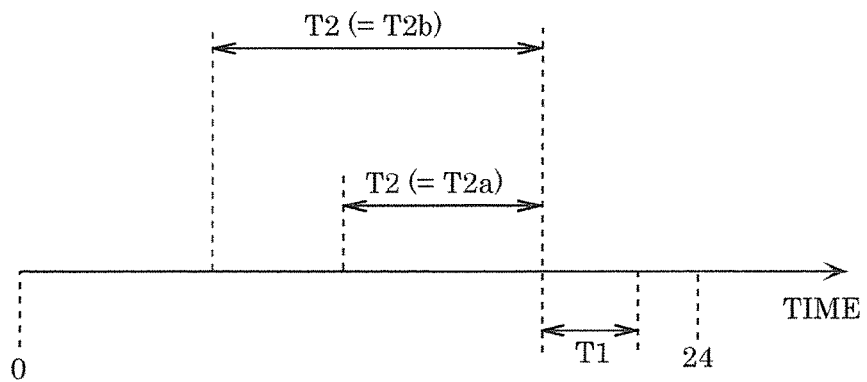
FIG. 6 is a conceptual diagram showing a limited time period according to the embodiment.

More precisely, limited time period T2 is previously set before specified time period T1 during the day, as shown in FIG. 6. When the remaining energy in rechargeable battery 5 is equal to or below threshold value K1, exclusively in limited time period T2, controller 11 controls rechargeable battery power conditioner 6 in the discharge prohibition mode so as to perform the discharge prohibition control. During the time excluding limited time period T2, controller 11 controls rechargeable battery power conditioner 6 in the discharge permission mode so as to perform the discharge permission control.

In other words, controller 11 may perform a discharge restriction which involves performing the discharge prohibition control when the remaining energy in rechargeable battery 5 is equal to or below threshold value K1 in limited time period T2. Thus, during the time other than limited time period T2, controller 11 may not perform such discharge restriction but perform the discharge permission control even when the remaining energy in rechargeable battery 5 is equal to or below threshold value K1.

For example, limited time period T2 is set according to the planned discharged energy amount that has been estimated by estimator 15. To be more concrete, when the planned discharged energy amount is small, limited time period T2 is set to limited time period T2*a* having a shorter length of time (the timing to start limited time period T2 is delayed). Also, when the planned discharged energy amount is large, limited time period T2 is set to limited time period T2*b* having a longer length of time (the timing to start limited time period T2 is advanced).

In other words, controller 11 may advance the start of the discharge restriction with the increase in the planned discharged energy amount. The discharge restriction involves prohibiting the discharge of rechargeable battery 5 when the remaining energy in rechargeable battery 5 is equal to or below threshold value K1. Accordingly, even in the case where the planned discharged energy amount is large, the remaining energy in rechargeable battery 5 can be sufficiently secured. Note that the timing to start limited time period T2 is set after or including 0 o'clock and is set every day.

In the present embodiment, solar cell 3 is used as the power source for the power generation utilizing a renewable energy source, however, a wind power generation apparatus may be used as such power source. With the use of solar cell 3 or the wind power generation apparatus, it is difficult to supply generated power in a stable manner, and cause the time period during which the generated power can be supplied to coincide with the time period during which power is consumed in a household.

Charge/discharge control apparatus 1 according to the present embodiment is particularly suitable for use in such difficult environment as described above.

As has been described above, charge/discharge control apparatus 1 is used in the power system for supplying power to load 7 using both the power generated by solar cell (power source) 3 for the power generation utilizing a renewable energy source and the power discharged from rechargeable battery 5. For example, charge/discharge control apparatus 1 includes controller 11 and setter 12.

Controller 11 performs the charge control to charge rechargeable battery 5 with the excess power that is not to be consumed by load 7 among the generated power, and the discharge control to discharge rechargeable battery 5. Setter 12 sets threshold value K1 for the remaining energy in rechargeable battery 5, according to the planned discharged energy amount which is planned as the discharged energy amount to be supplied from rechargeable battery 5 to load 7 during specified time period T1. Controller 11 performs the discharge prohibition control to prohibit the discharge of rechargeable battery 5 when the remaining energy in rechargeable battery 5 is equal to or below threshold value K1 prior to specified time period T1.

This enables charge/discharge control apparatus 1 to set, per household, threshold value K1 based on the planned discharged energy amount during specified time period T1, and thus, to determine whether or not to discharge rechargeable battery 5 by comparing the remaining energy in rechargeable battery 5 with threshold value K1. In other words, when the remaining energy in rechargeable battery 5 is equal to or below threshold value K1, charge/discharge control apparatus 1 can perform power control so that the remaining energy in rechargeable battery 5 covers the planned discharged energy amount, by prohibiting the discharge of rechargeable battery 5.

Thus, charge/discharge control apparatus 1 can adequately secure the remaining energy in rechargeable battery 5 prior to specified time period T1.

Controller 11 may perform the discharge permission control to permit the discharge of rechargeable battery 5 when the remaining energy in rechargeable battery 5 is above threshold value K1 prior to specified time period T1.

This enables the effective use of the remaining energy in rechargeable battery 5 prior to specified time period T1. Accordingly, the amount of electricity purchased from a commercial power retailer is restrained and the power cost is thus reduced.

Moreover, setter 12 may increase threshold value K1 with the increase in the planned discharged energy amount. Thus, threshold value K1 is set appropriately.

Moreover, setter 12 may increase threshold value K1 with the decrease in the time remaining until specified time period T1. This enables charge/discharge control apparatus 1 to balance, prior to specified time period T1, the use of the remaining energy in rechargeable battery 5 (restrain in the amount of electricity purchased from a commercial power retailer) with securing the remaining energy in rechargeable battery 5.

In other words, controller 11 may advance the start of the discharge restriction with the increase in the planned discharged energy amount. The discharge restriction involves performing the discharge prohibition control when the remaining energy in rechargeable battery 5 is equal to or below threshold value K1. Accordingly, even in the case where the planned discharged energy amount is large, charge/discharge control apparatus 1 can sufficiently secure the remaining energy in rechargeable battery 5.

Moreover, specified time period T1 may include the time period during which the amount of the energy consumed by load 7 is at its peak during the day. Accordingly, charge/discharge control apparatus 1 can adequately secure the remaining energy in rechargeable battery 5 prior to specified time period T1 including the time period during which the amount of load energy is at its peak.

Moreover, specified time period T1 may include the time period during which a unit cost of the commercial power supplied to load 7 is higher than that during another time period. This enables charge/discharge control apparatus 1 to adequately secure the remaining energy in rechargeable battery 5 prior to specified time period T1 during which the unit cost is relatively high.

Furthermore, a computer may be mounted onto charge/discharge control apparatus 1. With the execution of a program by the computer, each of the functions such as controller 11, setter 12, estimator 15 and so on that are included in charge/discharge control apparatus 1 may be realized.

For example, the computer may include, as main components, a device including a processor which executes a program, an interface device for sending and receiving data to and from other device, and a storage device for storing data. The device including such processor may be a CPU or an MPU in a body different from a semiconductor memory, or may be a microcomputer in which a semiconductor memory is incorporated. The storage device may be plural, and a storage device with short access time like a semiconductor memory and a storage device with large capacity like a hard disk drive may be used concurrently.

The types of program provision include: a type in which a program is previously stored in a storage medium such as a computer readable read only memory (ROM), an optical disc, and so on; and a type in which a program is provided to a storage medium via a wide area communication network including the Internet and others.

For example, a program causes a computer to function as charge/discharge control apparatus 1 (to be precise, at least as controller 11 and setter 12 in charge/discharge control apparatus 1).

With such program causing the computer to function as charge/discharge control apparatus 1, the same effects as has been described above can be achieved In other words, with this program, it is possible to adequately secure the remaining energy in rechargeable battery 5 prior to specified time period T1.

Note that the above-described embodiment is an example of the present invention. Therefore, the present invention shall not be limited to the above-described embodiment and other embodiments) resulting from various modifications according to design and others are possible without departing from the technical concept of the present invention.

The invention claimed is:

1. A charge/discharge control apparatus for use in a power system for supplying a load with power using discharged power from a rechargeable battery and generated power from a power source for power generation utilizing a renewable energy source, the apparatus comprising:
- a controller which performs a discharge control to discharge the rechargeable battery and a charge control to charge the rechargeable battery using excess power which is power, among the generated power, which is not to be consumed by the load; and
- a setter which sets a threshold value for remaining energy in the rechargeable battery, according to a planned discharged energy amount which is planned as a discharged energy amount to be supplied from the rechargeable battery to the load during a specified time period,
- wherein the controller performs a discharge prohibition control to prohibit a discharge of the rechargeable battery when the remaining energy in the rechargeable battery is equal to or below the threshold value during a limited time period prior to the specified time period, and
- the controller advances a start of the limited time period with an increase in the planned discharged energy.

2. The charge/discharge control apparatus according to claim 1,
- wherein the controller performs a discharge permission control to permit the discharge of the rechargeable battery when the remaining energy in the rechargeable battery is above the threshold value during the limited time period.

3. The charge/discharge control apparatus according to claim 1,
- wherein the setter increases the threshold value with an increase in the planned discharged energy.

4. The charge/discharge control apparatus according to claim 1,
- wherein the setter increases the threshold value with a decrease in time remaining until the specified time period.

5. The charge/discharge control apparatus according to claim 1,
- wherein the specified time period includes a time period during which an amount of energy consumed by the load is peak during a day.

6. The charge/discharge control apparatus according to claim 1,
- wherein the specified time period includes a time period during which a unit cost of commercial power supplied to the load is higher than the unit cost of the commercial power during another time period.

7. A non-transitory computer-readable storage medium in which a program is stored, the program causing a computer to function as the charge/discharge control apparatus according to claim 1.

* * * * *